United States Patent [19]

Lorenz et al.

[11] 3,891,642

[45] June 24, 1975

[54] O-ALKYL-O-6[P-HALOPHENYL]-PYRIDAZINYL-[3]-THIONO-PHOSPHORIC (PHOSPHONIC) ACID ESTERS

[75] Inventors: Walter Lorenz, Wuppertal; Ingeborg Hammann, Cologne, both of Germany

[73] Assignee: Bayer Aktiengesellschaft, Leverkusen, Germany

[22] Filed: Mar. 14, 1973

[21] Appl. No.: 341,189

[30] Foreign Application Priority Data

Mar. 23, 1972 Germany..................... 2214059

[52] U.S. Cl. ....... 260/250 AP; 260/250 A; 424/250
[51] Int. Cl. ............................ C07d 51/04
[58] Field of Search ............................ 260/250 AP

[56] References Cited
UNITED STATES PATENTS
2,759,938  8/1956  Breuil ........................ 260/250 AP
3,100,206  8/1963  Rigterink .................... 260/250 AP

*Primary Examiner*—Donald G. Daus
*Assistant Examiner*—James H. Turnipseed
*Attorney, Agent, or Firm*—Burgess, Dinklage & Sprung

[57] ABSTRACT

O-alkyl-O-6-[p-halophenyl]-pyridazinyl-[3]-thionophosphoric (phosphonic) acid esters of the formula

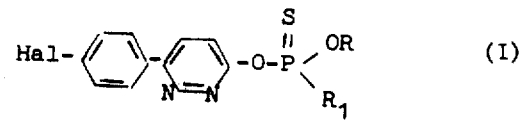

in which
R is alkyl of 1 to 6 carbon atoms,
$R_1$ is alkyl or alkoxy of 1 to 6 carbon atoms or phenyl, and
Hal is halogen
which possess insecticidal and acaricidal properties.

7 Claims, No Drawings

O-ALKYL-O-6(P-HALOPHENYL)-PYRIDAZINYL-(3)-THIONO-PHOSPHORIC (PHOSPHONIC) ACID ESTERS

The present invention relates to and has for its objects the provision of particular new O-alkyl-O-6-[p-halophenyl]-pyridazinyl-[3]-thionophosphoric (phosphonic) acid esters which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specification DOS No. 2,043,745 that phenyl-pyridazino(thiono)-phosphoric acid esters, for example O,O-diethyl-O-6-phenyl-pyridazinyl-(3)-thionophosphoric acid ester (Compound A), possess an insecticidal and acaricidal activity.

The present invention provides, as new compounds, the halogenophenyl-pyridazino-thiono-phosphoric(-phosphonic) acid esters of the general formula

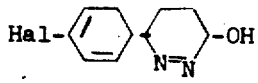

(I)

in which
R is alkyl of 1 to 6 carbon atoms,
$R_1$ is alkyl or alkoxy of 1 to 6 carbon atoms or phenyl, and
Hal is halogen.

Preferably, R is lower alkyl of 1 to 4 carbon atoms, $R_1$ is lower alkyl or lower alkoxy of 1 to 4 carbon atoms or phenyl, and Hal is chlorine or bromine.

Surprisingly, the halogenophenyl-pyridazino-thiono-phosphoric(phosphonic) acid esters according to the invention possess, in addition to an acaricidal action, a considerably stronger insecticidal action than the known phenyl-pyridazino-(thiono)phosphoric acid esters of analogous structure and identical type of action. The invention thus represents a genuine enrichment of the art. Furthermore, the compounds of this invention help satisfy the great demand for new active compounds in the field of pesticides. The latter demand results from the fact that the commercially available agents have to meet increasingly stringent requirements — particularly with regard to questions of protection of the environment — such as low toxicity to warm-blooded animals, low phytotoxicity, rapid degradation in and on the plant in short minimum intervals to be observed between spraying with pesticide and harvesting, activity against resistant pests and the like.

The present invention also provides a process for the production of a halogenophenyl-pyridazino-thionophosphoric-(phosphonic) acid ester of the formula (I) in which a 3-hydroxypyridazino derivative of the general formula

(III), is reacted, in the presence of an acid-acceptor or in the form of an alkali metal, alkaline earth metal or ammonium salt thereof, with a thionophosphoric(phosphonic) acid ester halide of the general formula

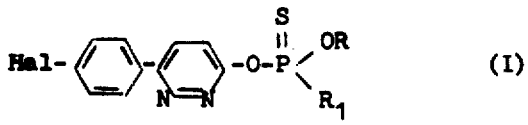

(II), in which formulas R, $R_1$ and Hal have the above-mentioned meanings.

If 6-(p-chlorophenyl)-3-hydroxypyridazine and O,O-diethylthionophosphoric acid ester chloride are used as the starting materials, the course of the reaction can be represented by the following equation:

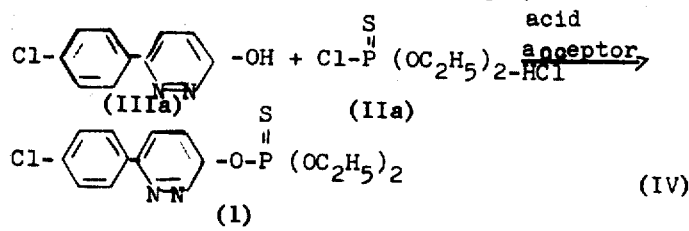

The following may be mentioned as examples of thiono-phosphoric(phosphonic) acid ester halides (II) which can be used according to the process: O,O-diethyl-, O,O-diisopropyl-, O,O-dibutyl-, O,O-di-tert.-butyl-, O-ethyl-O-isopropyl, O-ethyl-O-propyl-, O-ethyl-O-butyl-, O-isopropyl-O-butyl- and O-propyl-O-butyl-thiono-phosphoric acid ester chlorides and bromides, and also O-ethyl-ethane-, O-propyl-ethane-, O-isopropyl-ethane-, O-ethyl-propane-, O-ethyl-isopropane-, O-ethyl-butane-, O-isopropyl-propane-, O-ethyl-phenyl-, O-isopropyl-phenyl- and O-butyl-phenyl-thiono-phosphonic acid ester chlorides and bromides.

Examples of pyridazino derivatives (III) which can be used according to the process are: 6-(p-chloro- or p-bromo-phenyl)-3-hydroxypyridazine or their 3-keto tautomers.

The acid halides and pyridazine derivatives which are to be used are known and can be prepared in accordance with customary methods.

Possible solvents or diluents for carrying out the process are practically all inert organic solvents, especially aliphatic and aromatic, optionally chlorinated hydrocarbons, such as benzene, toluene, xylene, benzine, methylene chloride, chloroform, carbon tetrachloride and chlorobenzene; ethers, for example diethyl ether, dibutyl ether and dioxane; ketones, such as acetone, methyl ethyl ketone, methyl isopropyl ketone and methyl isobutyl ketone; and nitriles, preferably acetonitrile.

Possible acid-acceptors are all customary acid-binding agents. Alkali metal carbonates and alcoholates, such as sodium carbonate, potassium carbonate, sodium methylate, potassium methylate, sodium ethylate and potassium ethylate, and also aliphatic, aromatic or heterocyclic amines, for example triethylamine, dimethylamine, dimethylaniline, dimethylbenzylamine and pyridine, have proved particularly suitable.

The reaction temperatures can be varied over a fairly wide range. In general the reaction is carried out at about 10° to 120°, preferably at about 60° to 80°C.

The reaction is generally carried out under normal pressure.

To carry out the process, the starting components are generally reacted in an equimolar ratio, in one of the above-mentioned solvents, at the indicated temperatures, if appropriate in the presence of an acid-acceptor. After stirring the mixture at an elevated temperature for several hours, the mixture is filtered if necessary and poured into water, and the crystalline precipitate which separates out is filtered off, washed and recrystallized.

The compounds according to the invention are obtained in crystalline form and are characterized by their melting points.

As already mentioned, the compounds according to the invention possess — coupled with only slight phytotoxicity — an excellent insecticidal activity and also an acaricidal activity, against plant pests, pests harmful to health and pests of stored products. Herein, they are distinguished by a good action against both sucking and biting insects and against mites (Acarina).

For these reasons, the compounds according to the invention may be successfully employed as pesticides, especially in plant protection and the protection of stored products, and also in the hygiene field.

The sucking insects combated in the main include aphids (Aphididae) such as the green peach aphid (*Myzus persicae*), the bean aphid (*Doralis fabae*), the bird cherry aphid (Rhopalosiphum padi), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius* = *Calandra granaria*), the Colorado beetle (*Lepitinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthos-celides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus-surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acarina) there are classed, in particular, the spider mites (Tetranychidae) such as the two-spotted spider mite (*Tetranychus urticae*) and the European red mite (*Paratetranychus pilosus* = *Panonychus ulmi*), gall mites, for example the black-currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against pests harmful to health and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.), and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, rodenticides and fungicides, or bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Ceratitis Test

Solvent: 3 parts by weight of acetone
Emulsifier: 1 part by weight of alkylaryl polyglycol ether To produce a suitable preparation of active compound, 1 part by weight of the active compound is mixed with the stated amount of solvent containing the stated amount of emulsifier, and the concentrate is diluted with water to the desired concentration. 1 cm$^3$ of the preparation of the active compound is pipetted onto a filter paper disc of about 7 cm diameter. This is placed on a glass in which there are about 30 fruit flies (*Ceratitis capitata*) and covered with a glass plate.

After the specified periods of time, the destruction is determined as a percentage. 100% means that all the flies were killed. 0% means that none of the flies were killed.

The active compounds, the concentrations of the active compounds, the evaluation times and the degree of destruction can be seen from the following Table 1:

Table 1

| Active compound | (Ceratitis test) Active compound concentration in % by weight | Degree of destruction in % after 1 day |
|---|---|---|
| (known) [phenyl-pyridazine-O—P(S)(OC₂H₅)₂] (A) | 0.1<br>0.02 | 50<br>0 |
| Cl—[phenyl-phenyl-pyridazine]—O—P(S)(OC₂H₅)₂ (1) | 0.1<br>0.02<br>0.004<br>0.0008 | 100<br>100<br>100<br>60 |
| Br—[phenyl-phenyl-pyridazine]—O—P(S)(OC₂H₅)₂ (2) | 0.1<br>0.02<br>0.004 | 100<br>100<br>70 |

EXAMPLE 2

Plutella Test

Solvent: 3 parts by weight of acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from the following Table 2:

EXAMPLE 3

Myzus Test (contact action)

Solvent: 3 parts by weight of acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

Table 2

| Active compound | (Plutella test) Active compound concentration in % by weight | Degree of destruction in % after 3 days |
|---|---|---|
| (known) [phenyl-pyridazine-O—P(S)(OC₂H₅)₂] (A) | 0.004<br>0.0008<br>0.00016 | 100<br>40<br>0 |
| Cl—[phenyl-phenyl-pyridazine]—O—P(S)(OC₂H₅)₂ (1) | 0.004<br>0.0008<br>0.00016 | 100<br>100<br>70 |
| Cl—[phenyl-phenyl-pyridazine]—O—P(S)(C₂H₅)(OC₂H₅) (4) | 0.004<br>0.0008<br>0.00016 | 100<br>95<br>60 |
| Br—[phenyl-phenyl-pyridazine]—O—P(S)(OC₂H₅)₂ (2) | 0.004<br>0.0008<br>0.00016 | 100<br>100<br>70 |
| Br—[phenyl-phenyl-pyridazine]—O—P(S)(C₂H₅)(OC₂H₅) (3) | 0.004<br>0.0008<br>0.00016 | 100<br>80<br>60 |

The active compounds, the concentrations of the active compounds, the evaluation times and the results can be seen from the following Table 3:

chlorophenyl)-pyridazinyl-(3)-thionophosphoric acid ester are obtained in the form of beige-colored crystals of melting point 97°C.

Table 3

| Active compound | (Myzus test) Active compound concentration in % by weight | Degree of destruction in % after 1 day |
| --- | --- | --- |
| (known) (A) | 0.1<br>0.02 | 100<br>20 |
| (1) | 0.1<br>0.02<br>0.004 | 100<br>100<br>80 |
| (4) | 0.1<br>0.02<br>0.004<br>0.0008<br>0.00016 | 100<br>100<br>98<br>80<br>50 |
| (2) | 0.1<br>0.02<br>0.004 | 100<br>100<br>40 |
| (3) | 0.1<br>0.02<br>0.004 | 100<br>100<br>50 |

The process of this invention is illustrated by the following preparative Example.

The following compounds can be produced in an analogous manner:

| Structure | Melting point. °C | Yield (% of theory) |
| --- | --- | --- |
| (2) | 99 | 39.0 |
| (3) | 95–96 | 57.0 |
| (4) | 93–94 | 32.8 |
| (5) | 79 | 60 |
| (6) | 98 | 61 |

EXAMPLE 4

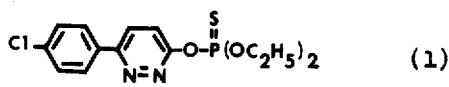 (1)

83 g (0.4 mole) of 6-(p-chlorophenyl)-pyridazone-(3) are dissolved in 460 ml of acetonitrile. After adding 70 g of potassium carbonate, 83 g (0.42 mole) of O,O-diethyl-thiono-phosphoric acid diester chloride are added dropwise to the mixture at 70°C. To complete the reaction, the reaction mixture is subsequently warmed to 70°C for 5 hours while stirring and is allowed to cool. After filtration, if necessary, the batch is poured into water and the precipitate which has separated out is filtered off, and washed with water and twice with petroleum ether. The product can be recrystallized from a mixture of petroleum ether/ethyl acetate. 65 g (45.5% of theory) of O,O-diethyl-O-6-(p-

It will be appreciated that the instant specification and examples are set forth by way of illustration and not limitation, and that various modifications and changes may be made without departing from the spirit and scope of the present invention.

What is claimed is:

1. An O-alkyl-O-6-[p-halogenophenyl]-pyridazinyl-[3]thionophosphoric(phosphonic) acid ester of the formula

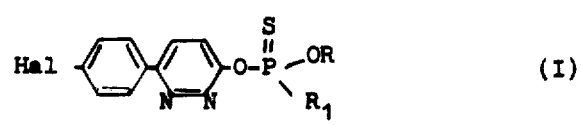 (I)

in which

R is alkyl of 1 to 6 carbon atoms, $R_1$ is alkyl or alkoxy of 1 to 6 carbon atoms or phenyl, and Hal is chlorine and bromine.

2. A compound according to claim 1, in which R is lower alkyl; $R_1$ is lower alkyl or lower alkoxy of 1 to 4 carbon atoms or phenyl.

3. The compound according to claim 1 wherein such compound is O,O-diethyl-O-6-(p-chlorophenyl)-pyridazinyl-(3)-thionophosphoric acid ester of the formula

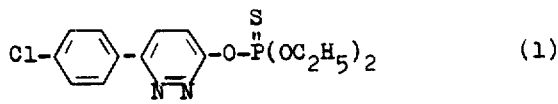 (1)

4. The compound according to claim 1 wherein such compound is O,O-diethyl-O-6-(p-bromophenyl)-pyridazinyl-(3)-thionophosphoric acid ester of the formula

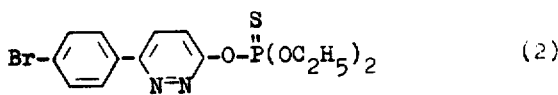 (2)

5. The compound according to claim 1 wherein such compound is ethyl-O-ethyl-O-6-(p-bromophenyl)-pyridazinyl-(3)-thionophosphonic acid ester of the formula

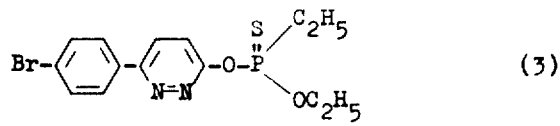 (3)

6. The compound according to claim 1 wherein such compound is ethyl-O-ethyl-O-6-(p-chlorophenyl)-pyridazinyl-(3)-thionophosphonic acid ester of the formula

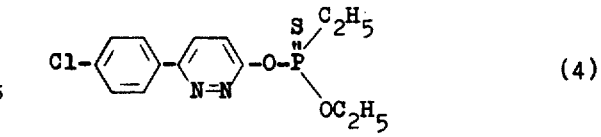 (4)

7. The compound according to claim 1 wherein such compound is phenyl-O-ethyl-O-6-(p-chlorophenyl)-pyridazinyl-(3)-thionophosphonic acid ester of the formula

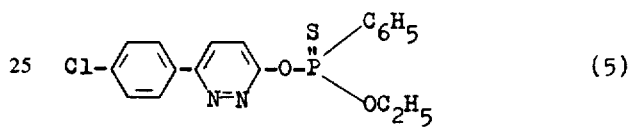 (5)

* * * * *

UNITED STATES PATENT OFFICE
CERTIFICATE OF CORRECTION

Patent No. 3,891,642              Dated June 24, 1975

Inventor(s) Walter Lorenz et al.

It is certified that error appears in the above-identified patent and that said Letters Patent are hereby corrected as shown below:

The term of this patent subsequent to April 15, 1992, has been disclaimed.

Signed and Sealed this twenty-second Day of June 1976

[SEAL]

Attest:

RUTH C. MASON
*Attesting Officer*

C. MARSHALL DANN
*Commissioner of Patents and Trademarks*